(12) United States Patent
Shimizu (10) Patent No.: US 10,279,693 B2
(45) Date of Patent: May 7, 2019

(54) VEHICLE FRONT PORTION STRUCTURE

(71) Applicant: TOYOTA JIDOSHA KABUSHIKI KAISHA, Toyota-shi, Aichi-ken (JP)

(72) Inventor: Kazuki Shimizu, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/954,896

(22) Filed: Apr. 17, 2018

(65) Prior Publication Data

US 2018/0361857 A1 Dec. 20, 2018

(30) Foreign Application Priority Data

Jun. 16, 2017 (JP) .................................. 2017-118896

(51) Int. Cl.

| | | |
|---|---|---|
| *B60K 1/04* | (2019.01) | |
| *B60L 11/18* | (2006.01) | |
| *B60K 6/00* | (2006.01) | |
| *B60L 3/00* | (2019.01) | |
| *B62D 21/02* | (2006.01) | |
| *B62D 21/15* | (2006.01) | |

(52) U.S. Cl.
CPC .............. *B60L 11/182* (2013.01); *B60K 1/04* (2013.01); *B60K 6/00* (2013.01); *B60L 3/0007* (2013.01); *B60L 11/1877* (2013.01); *B60L 11/1879* (2013.01); *B62D 21/02* (2013.01); *B62D 21/152* (2013.01)

(58) Field of Classification Search
CPC .... B60L 11/182; B62D 21/152; B62D 21/155

USPC ...................... 180/312, 232; 296/187.03, 204
See application file for complete search history.

(56) References Cited

U.S. PATENT DOCUMENTS

| | | | | |
|---|---|---|---|---|
| 5,573,090 | A  * | 11/1996 | Ross ....................... | B60L 5/005 180/2.1 |
| 5,915,494 | A  * | 6/1999 | Matsumura .............. | B60K 5/04 180/232 |
| 6,421,600 | B1 * | 7/2002 | Ross ....................... | B60L 5/005 180/167 |
| 6,808,229 | B2 * | 10/2004 | Yamaguchi ............ | B62D 25/08 296/203.02 |

(Continued)

FOREIGN PATENT DOCUMENTS

| | | |
|---|---|---|
| DE | 102014018753 A1 | 6/2016 |
| JP | 2012-254778 A | 12/2012 |

(Continued)

OTHER PUBLICATIONS

Oct. 26, 2018 Extended Search Report issued in European Patent Application No. 18177618.8.

*Primary Examiner* — Jeffrey J Restifo (74) *Attorney, Agent, or Firm* — Oliff PLC (57) ABSTRACT

A vehicle front portion structure includes: a non-contact charger disposed at a lower side of a vehicle front portion, configured to receive electric power transmitted from a non-contact power transmitting system, and carrying out charging of a battery that is installed in a vehicle; and a cross member disposed at the vehicle front portion further toward a vehicle front side than the non-contact charger, and extending in a vehicle transverse direction, a bottom surface of the cross member being disposed further toward a vehicle lower side than a bottom surface of the non-contact charger.

5 Claims, 8 Drawing Sheets

(56) References Cited

U.S. PATENT DOCUMENTS

| | | | | |
|---|---|---|---|---|
| 6,899,195 | B2 * | 5/2005 | Miyasaka | B62D 21/152 180/312 |
| 7,144,039 | B2 * | 12/2006 | Kawasaki | B60K 1/04 280/784 |
| 7,281,755 | B2 * | 10/2007 | Coakley | B62D 21/15 296/187.03 |
| 7,380,829 | B2 * | 6/2008 | Kishima | B62D 21/155 180/232 |
| 7,594,559 | B2 * | 9/2009 | Kitoh | B62D 21/155 180/232 |
| 7,654,543 | B2 * | 2/2010 | Tanaka | B60G 7/02 180/312 |
| 7,669,688 | B2 * | 3/2010 | Yamaguchi | B62D 21/152 180/232 |
| 7,886,861 | B2 * | 2/2011 | Nozaki | B60K 1/00 180/232 |
| 7,896,428 | B2 * | 3/2011 | Tamakoshi | B62D 21/152 296/187.03 |
| 8,490,988 | B2 * | 7/2013 | Takeshita | B62D 21/155 280/124.109 |
| 8,585,133 | B2 * | 11/2013 | Yasuhara | B62D 21/11 296/187.09 |
| 8,794,646 | B1 * | 8/2014 | Onishi | B62D 21/155 280/124.109 |
| 8,794,696 | B2 * | 8/2014 | Iseki | B62D 21/11 296/203.02 |
| 8,875,834 | B1 * | 11/2014 | Sirbu | B62D 21/10 180/312 |
| 8,905,466 | B2 * | 12/2014 | Iseki | B62D 21/11 296/203.02 |
| 9,010,849 | B2 * | 4/2015 | Komiya | B62D 21/11 280/124.109 |
| 9,016,424 | B2 * | 4/2015 | Awano | B62D 3/12 180/274 |
| 9,333,870 | B2 * | 5/2016 | Kume | B60L 11/182 |
| 9,415,697 | B2 * | 8/2016 | Asai | B60L 11/182 |
| 9,502,908 | B2 * | 11/2016 | Okamoto | H02J 50/80 |
| 9,539,908 | B2 * | 1/2017 | Asai | H02J 7/025 |
| 9,650,074 | B2 * | 5/2017 | Shirooka | B62D 21/11 |
| 9,774,213 | B2 * | 9/2017 | Ozaki | B60L 5/00 |
| 9,776,661 | B2 * | 10/2017 | Kaneko | B62D 21/155 |
| 9,944,192 | B2 * | 4/2018 | Ricci | B60L 11/1825 |
| 9,969,281 | B2 * | 5/2018 | Nakamura | B60L 11/123 |
| 9,984,806 | B2 * | 5/2018 | Shimode | H01F 27/06 |
| 9,991,047 | B2 * | 6/2018 | Yamakawa | H01F 38/14 |
| 2013/0193749 | A1 * | 8/2013 | Nakamura | B60L 3/00 307/9.1 |
| 2013/0300359 | A1 * | 11/2013 | Nakamura | B60L 11/182 320/108 |
| 2016/0236574 | A1 * | 8/2016 | Asai | B60K 1/04 |
| 2016/0243948 | A1 * | 8/2016 | Asai | H02M 7/44 |

FOREIGN PATENT DOCUMENTS

| | | |
|---|---|---|
| JP | 2014-226016 A | 12/2014 |
| WO | 2012/157661 A1 | 11/2012 |

* cited by examiner

VEHICLE FRONT PORTION STRUCTURE

CROSS-REFERENCE TO RELATED APPLICATION

This application claims priority under 35 USC 119 from Japanese Patent Application No. 2017-118896 filed Jun. 16, 2017, the disclosure of which is incorporated by reference herein.

BACKGROUND

Technical Field

Preferred embodiments relate to a vehicle front portion structure.

Related Art

Systems that transfer electric power via magnetic flux and in a non-contact manner are known as systems for charging a battery that is installed in a vehicle. For example, Japanese Patent Application Laid-Open (JP-A) No. 2014-226016 discloses a system that supplies electric power from a power transmitting coil, which is set on the ground, to a power receiving coil that is installed at a bottom surface of a vehicle body. In a case in which a power receiving coil that is used as a non-contact charger is installed at the bottom surface of a vehicle body as in the system of JP-A No. 2014-226016, damage to the power receiving coil due to contact with an obstacle that is on the road is of concern.

SUMMARY

In consideration of the above circumstances, an object of preferred embodiments is to provide a vehicle front portion structure that can protect a non-contact charger that is installed at a vehicle lower side.

In order to achieve the above-described object, a vehicle front portion structure of a first aspect of the disclosure includes: a non-contact charger disposed at a lower side of a vehicle front portion, configured to receive electric power transmitted from a non-contact power transmitting system, and carrying out charging of a battery that is installed in a vehicle; and a cross member disposed at the vehicle front portion further toward a vehicle front side than the non-contact charger, and extending in a vehicle transverse direction, a bottom surface of the cross member being disposed further toward a vehicle lower side than a bottom surface of the non-contact charger.

In the vehicle front portion structure of the first aspect, the cross member is disposed further toward the vehicle front side than the non-contact charger. The bottom surface of the cross member is disposed further toward the vehicle lower side than the bottom surface of the non-contact charger. Therefore, even if, on the road, there is an obstacle that may interfere with the non-contact charger, the cross member contacts the obstacle before the non-contact charger may contact the obstacle, and the load input to the non-contact charger can be reduced. Accordingly, the non-contact charger can be protected.

In a vehicle front portion structure of a second aspect of the disclosure, in the first aspect, the non-contact charger is mounted to the cross member.

In the vehicle front portion structure of the second aspect, there is no need to provide separate members for mounting the non-contact charger to the vehicle front portion, and an increase in the number of parts can be suppressed.

A vehicle front portion structure of a third aspect of the disclosure, in the first aspect or the second aspect, further includes a suspension member having a pair of side rails that are provided at the vehicle front portion, each side rail being disposed with an interval between the pair of side rails in the vehicle transverse direction, and each side rale extending in a vehicle longitudinal direction, wherein the cross member is a front cross member that spans between the pair of side rails and structures a portion of the suspension member.

In the vehicle front portion structure of the third aspect, the front cross member that structures a portion of the suspension member also functions as the cross member. Therefore, there is no need to provide a separate member as the cross member, and an increase in the number of parts can be suppressed.

A vehicle front portion structure of a fourth aspect of the disclosure, in the third aspect, further includes a rear cross member spanning between the pair of side rails, structuring a portion of the suspension member, and being disposed further toward a vehicle rear side than the front cross member, wherein the non-contact charger is mounted to the rear cross member.

In the vehicle front portion structure of the fourth aspect, there is no need to provide separate members for mounting the non-contact charger to the vehicle front portion, and an increase in the number of parts can be suppressed.

In a vehicle front portion structure of a fifth aspect of the disclosure, in the fourth aspect, the non-contact charger is disposed between the front cross member and the rear cross member, and a bottom surface of the rear cross member is disposed further toward a lower side than the bottom surface of the non-contact charger.

In accordance with the vehicle front portion structure of the fifth aspect, the bottom surface of the rear cross member, which is disposed at the vehicle rear side of the non-contact charger, is disposed further toward the vehicle lower side than the bottom surface of the non-contact charger. Therefore, also at times when the vehicle is traveling in reverse, the non-contact charger can be protected from obstacles that are on the road.

A vehicle front portion structure of a sixth aspect of the disclosure, in the fourth aspect, further includes an intermediate cross member spanning between the pair of side rails, structuring a portion of the suspension member, and being disposed between the front cross member and the rear cross member, wherein the non-contact charger is mounted to any two cross members within the front cross member, the intermediate cross member or the rear cross member.

In the vehicle front portion structure of the sixth aspect, the bottom surface of the front cross member is disposed further toward the vehicle lower side than the bottom surface of the non-contact charger. Therefore, even if, on the road, there is an obstacle that may interfere with the non-contact charger, the front cross member contacts the obstacle before the non-contact charger may contact the obstacle, and the non-contact charger can be protected.

In accordance with the vehicle front portion structure of the present disclosure, a non-contact charger that is installed at a vehicle lower side can be protected.

BRIEF DESCRIPTION OF THE DRAWINGS

Preferred embodiments will be described in detail based on the following figures, wherein.

DETAILED DESCRIPTION

First Embodiment

A vehicle front portion structure relating to a first embodiment of the present invention is described with reference to FIG. 1 through FIG. 5. Note that a vehicle vertical direction upper side is indicated by arrow UP, a vehicle longitudinal direction front side is indicated by arrow FR, and a vehicle transverse direction is indicated by arrow W. Further, in the following description, when longitudinal, vertical and left-right directions are used without being specified, they refer to the longitudinal of the vehicle longitudinal direction, the vertical of the vehicle vertical direction, and the left and right in a case of facing in the advancing direction.

First, a vehicle 12 to which a vehicle front portion structure 10 is applied is described.

Figure 1:
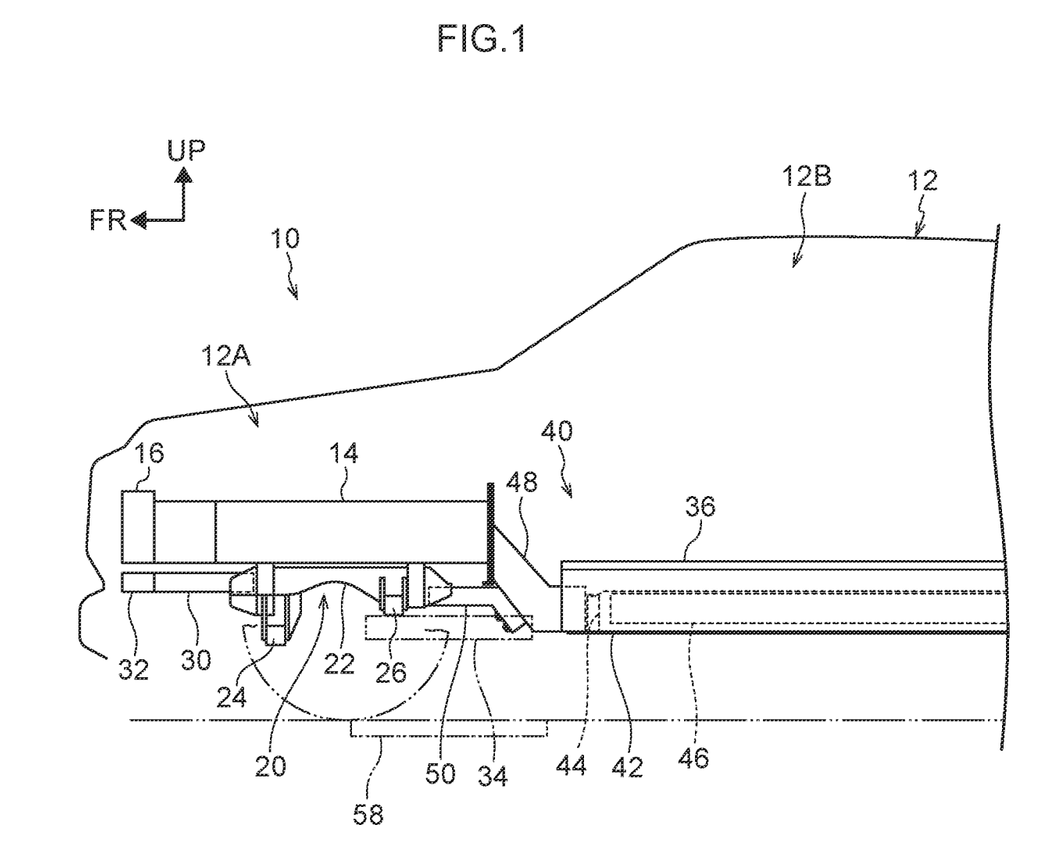
FIG. 1 is a side view showing an overview from a vehicle front portion, to which a vehicle front portion structure of a first embodiment is applied, to a vehicle cabin.

As shown in FIG. 1, the vehicle 12 is an electric automobile, and has a vehicle front portion chamber 12A and a vehicle cabin 12B. The vehicle front portion chamber 12A is disposed at a vehicle front side, and various types of members such as electrical components, a gear box, auxiliary equipment, and the like are accommodated at an interior thereof. The vehicle cabin 12B is disposed adjacent to a rear side of the vehicle front portion chamber 12A.

Figure 2:
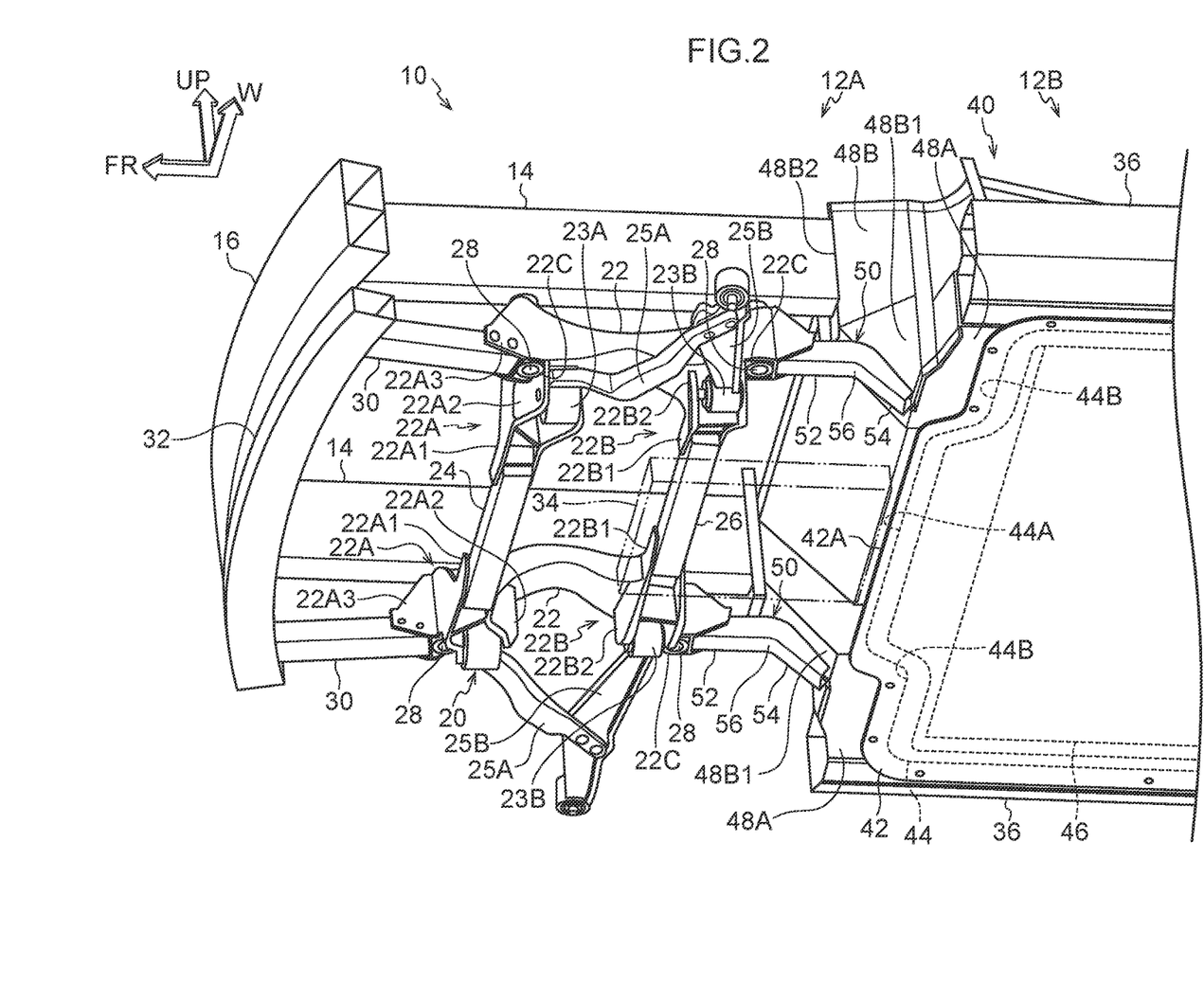
FIG. 2 is a perspective view in which the vehicle front portion structure of the first embodiment is seen from the vehicle lower side.
Figure 3:
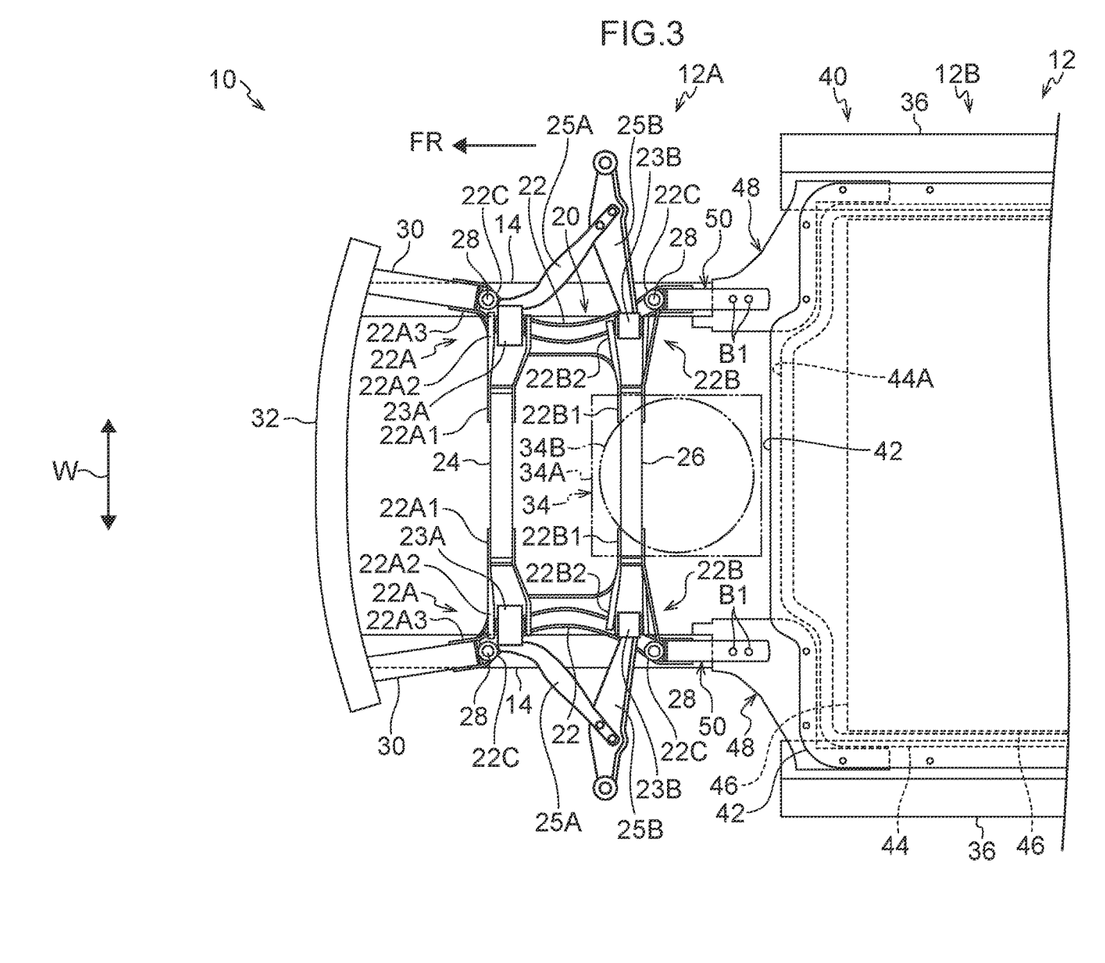
FIG. 3 is a bottom view of the vehicle front portion structure of the first embodiment.

Front side members 14 that are vehicle frame members are disposed in the vehicle front portion chamber 12A. As shown in FIG. 2 and FIG. 3, the front side members 14 are a pair of left and right vehicle frame members that extend in the vehicle longitudinal direction at both side end portions in the vehicle transverse direction.

A front reinforcement 16 is mounted to front ends of the front side members 14. The front reinforcement 16 extends in the vehicle transverse direction, and connects the front ends of the pair of front side members 14. Rear ends of the front side members 14 are connected to battery front side portions 48 of a battery accommodating portion 40 that is described later.

A suspension member 20 that is a sub-frame of the vehicle is disposed at a lower side of the respective front side members 14. The suspension member 20 has a pair of side rails 22, a front cross member 24, and a rear cross member 26.

Figure 4:
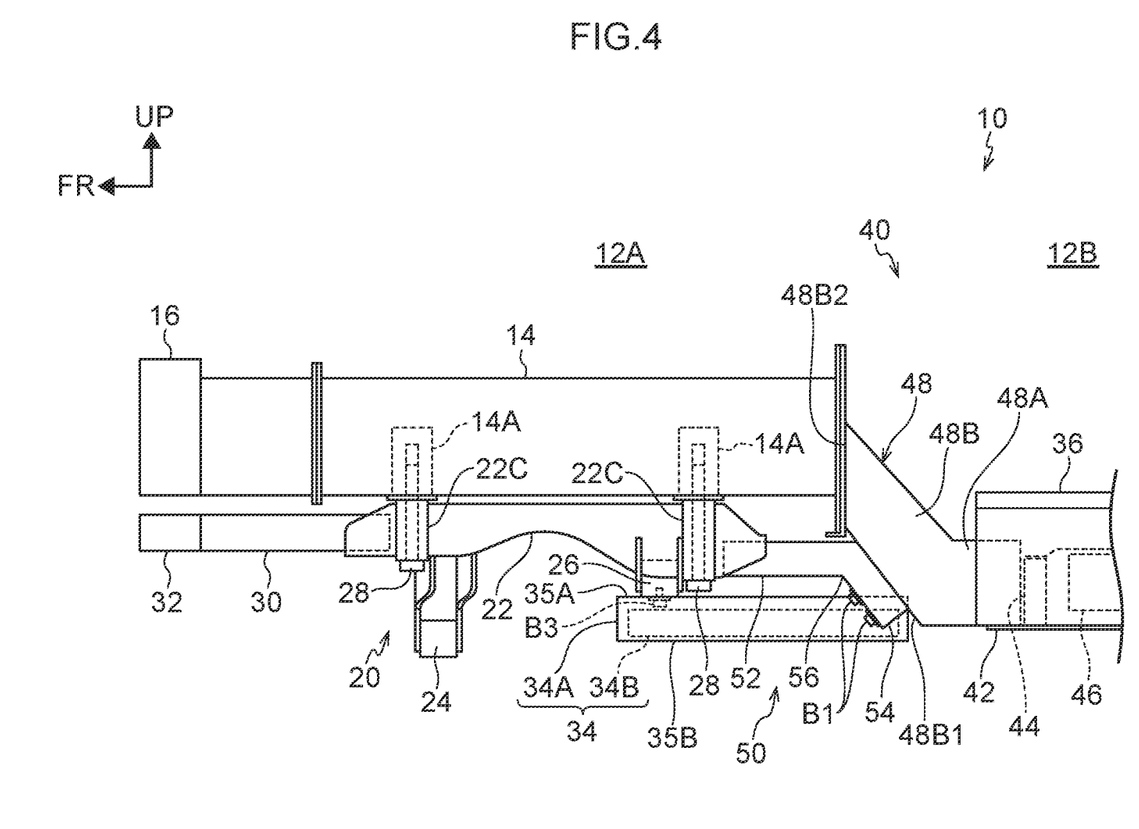
FIG. 4 is a side view showing the vehicle front portion structure of the first embodiment.

As shown in FIG. 4, the pair of side rails 22 are disposed at lower sides of the front side members 14. The pair of side rails 22 are respectively disposed so as to be apart from the front side members 14 and so as to be substantially parallel to the front side members 14 as seen in a side view. As shown in FIG. 3, the respective side rails 22 are made to be shapes that are gently curved such that vehicle longitudinal direction intermediate portions thereof are convex toward the vehicle transverse direction inner side.

A front end portion 22A that projects-out toward a vehicle transverse direction inner side is formed at a front end of the side rail 22. A rear end portion 22B that projects-out toward a vehicle transverse direction inner side is formed at a rear end of the side rail 22. The rear end portion 22B is disposed further toward an upper side than the front end portion 22A. Further, a bolt fastening portion 22C is formed at a front end part and a rear end part of the side rail 22 respectively. A bolt 28 is inserted into the bolt fastening portion 22C from a lower side, and the bolt 28 is fastened to a bolt fastening portion 14A that is formed at the front side member 14. The respective side rails 22 are supported by the bolts 28 at the vehicle longitudinal direction both end portions, so as to hang-down from the front side members 14.

The front end portion 22A has a front cross mounting portion 22A1, an arm mounting portion 22A2 and a lower side mounting portion 22A3 that are formed integrally. The pair of front cross mounting portions 22A1 project-out toward a vehicle transverse direction inner side and face one another in the vehicle transverse direction. The front cross mounting portions 22A1 are connected together by the front cross member 24 that extends in the vehicle transverse direction. Front lower arms 25A are connected to the arm mounting portions 22A2 via front bushes 23A that are for damping vibrations. Lower side members 30 that are described later are connected to the lower side mounting portions 22A3.

The rear end portion 22B has a rear cross mounting portion 22B1 and an arm mounting portion 22B2 that are formed integrally. The pair of rear cross mounting portions 22B1 project-out toward a vehicle transverse direction inner side and face one another in the vehicle transverse direction. The rear cross mounting portions 22B1 are connected together by the rear cross member 26 that extends in the vehicle transverse direction. A bottom surface of the rear cross member 26 is disposed further toward an upper side than a bottom surface of the front cross member 24. Rear lower arms 25B are connected to the arm mounting portions 22B2 via rear bushes 23B that are for damping vibrations.

The side rail 22, the front end portion 22A, the rear end portion 22B and the bolt fastening portions 22C are structured integrally. In the present embodiment, the front end portion 22A, the rear end portion 22B and the bolt fastening portions 22C are manufactured by aluminum die casting by using aluminum as the main material. Further, the front cross member 24 and the rear cross member 26 are aluminum extrusion molded products that are manufactured by extrusion molding aluminum.

The lower side members 30 are connected to the pair of lower side mounting portions 22A3, respectively. The lower side members 30 extend-out toward a vehicle front from the front end part of the side rails 22. A lower reinforcement 32 is mounted to front ends of the lower side members 30. The lower reinforcement 32 extends in the vehicle transverse direction, and connects the front ends of the pair of lower side members 30. Further, the lower reinforcement 32 is disposed directly beneath the front reinforcement 16 so as to overlap the front reinforcement 16 in the vehicle vertical direction.

A pair of rocker members 36 are disposed at a lower side of the vehicle cabin 12B, at both outer side ends in the vehicle transverse direction. The rocker members 36 extend in the vehicle longitudinal direction. The rocker members 36 have closed cross-sections, and structure a pair of left and right vehicle frame members.

The battery accommodating portion 40 is provided between the pair of rocker members 36. The battery accommodating portion 40 is disposed at a lower side of the vehicle cabin 12B, and has a bottom plate 42, a battery frame portion 44, a battery 46, and the battery front side portions 48.

The bottom plate 42 is shaped as a substantially rectangular plate, and covers the entire battery accommodating portion 40 from a lower side thereof. A convex portion 42A that is convex toward a front side is formed integrally with the central portion of a front side of the bottom plate 42. The battery frame portion 44 is shaped as a frame that has a uniform height, and is disposed along an outer edge of the bottom plate 42. A convex frame portion 44A is formed at the battery frame portion 44 at a portion, which corresponds to the convex portion 42A, of the front side. Front concave portions 44B are formed at vehicle transverse direction both sides of the front end that sandwich the convex frame portion 44A of the battery frame portion 44 therebetween. The battery 46 is accommodated on the bottom plate 42 that is at an inner side of the battery frame portion 44. Side surfaces of the battery 46, i.e., side wall portions that stand-up from the bottom plate 42, are surrounded by the battery frame portion 44.

The battery front side portions 48 are provided at the vehicle transverse direction both sides of the front end that sandwich the convex frame portion 44A of the battery frame portion 44 therebetween. The battery front side portion 48 has a bottom portion 48A that extends from the battery frame portion 44 toward the front side along the bottom plate 42, and an inclined portion 48B that extends obliquely toward the front and upper side from the front end of the bottom portion 48A. The bottom portion 48A is fixed to the bottom plate 42. An inclined surface 48B1, to which a connecting member 50 that is described later is mounted, is formed at the bottom surface of the inclined portion 48B. A forward-facing surface 48B2, which stands in the vehicle vertical direction and faces the front side, is formed at the front end of the inclined portion 48B. The rear end of the front side member 14 is fixed to the forward-facing surface 48B2.

The side rails 22 of the suspension member 20 and the battery front side portions 48 of the battery accommodating portion 40 are connected by the connecting members 50. Each of the connecting members 50 has a front side connecting portion 52 and a rear side connecting portion 54. A front end of the front side connecting portion 52 is fixed to the rear end of the side rail 22 further toward a rear side than the bolt 28, and the front side connecting portion 52 extends rearward substantially parallel to the side rail 22. As an example, the front side connecting portion 52 can be fixed to the side rail 22 by arc welding.

The rear side connecting portion 54 is bent toward a vehicle rear and lower side from a rear end of the front side connecting portion 52, and extends along the inclined surface 48B1, and is fixed to the inclined surface 48B1 of the battery front side portion 48. As an example, the rear side connecting portion 54 can be fixed to the inclined surface 48B1 of the battery front side portion 48 by bolts B1.

The connecting member 50 is formed by a ductile member, and is an aluminum extrusion molded product. The ductility of the connecting member 50 is greater than that of the side rail 22. The bent portion, which is between the front side connecting portion 52 and the rear side connecting portion 54, of the connecting member 50 is a deforming portion 56.

As shown in FIG. 1 through FIG. 3, a non-contact charger 34 is disposed at a lower side of the suspension member 20. The non-contact charger 34 is a device that receives the electric power transmitted from a non-contact power transmitting system at the exterior, and carries out charging of the battery 46 in a non-contact manner. As an example, a power supplying system that utilizes electromagnetic induction at a power supplying stand can be used. The non-contact charger 34 has a power receiving coil 34B that receives electric power from a power transmitting coil 58 (see FIG. 1) of the non-contact power transmitting system, and a housing 34A that houses the power receiving coil 34B at the interior thereof, and, in addition, has a communication section, a rectifying section and the like that are not illustrated.

The non-contact charger 34 is rectangular as seen in plan view. A top end in the vertical direction of the housing 34A is a top surface 35A, and a bottom end is a bottom surface 35B. The top surface 35A is disposed at a bottom surface side of the rear cross member 26, and the non-contact charger 34 is mounted to the rear cross member 26 by bolts B3.

A front end of the non-contact charger 34 is disposed further toward the front side than the rear cross member 26, and is disposed further toward a rear side than the front cross member 24. A rear end of the non-contact charger 34 is disposed further toward a rear side than the rear cross member 26, and is disposed at a front side of the convex frame portion 44A. The bottom surface 35B of the non-contact charger 34 is disposed further toward an upper side than a bottom surface of the front cross member 24.

Operation of the present embodiment is described next.

When the battery 46 is to be charged, the vehicle 12 is parked at a position at which the non-contact charger 34 is disposed directly above the power transmitting coil 58. When the transmitting of electric power at the power transmitting coil 58 side and the receiving of electric power at the vehicle 12 side are turned on, electric power is supplied from the power transmitting coil 58 to the non-contact charger 34. Because the non-contact charger 34 is disposed at the lower side of the vehicle 12, the distance between the non-contact charger 34 and the power transmitting coil 58 is short, and it is easy for the supplying of electric power in a non-contact manner to be carried out.

When the vehicle 12 is traveling, if, on the road, there is an obstacle that may interfere with the bottom surface of the vehicle 12, the front cross member 24, which projects-out further toward the lower side than the non-contact charger 34, contacts that obstacle. Accordingly, either contact between the non-contact charger 34 and the obstacle can be avoided, or, even if the obstacle does contact the non-contact charger 34, the load input to the non-contact charger 34 is reduced, and the non-contact charger 34 can be protected.

Further, in the present embodiment, the non-contact charger 34 is protected by the front cross member 24 that structures a portion of the suspension member 20. Therefore, there is no need to provide separate members, and an increase in the number of parts can be suppressed.

Further, in the present embodiment, the non-contact charger 34 is mounted to the rear cross member 26 that structures a portion of the suspension member 20. Therefore, there is no need to provide separate members for mounting the non-contact charger 34, and an increase in the number of parts can be suppressed.

Second Embodiment

A second embodiment of the present invention is described next. In the present embodiment, portions that are similar to those of the first embodiment are denoted by the same reference numerals, and detailed description thereof is omitted.

Figure 5:
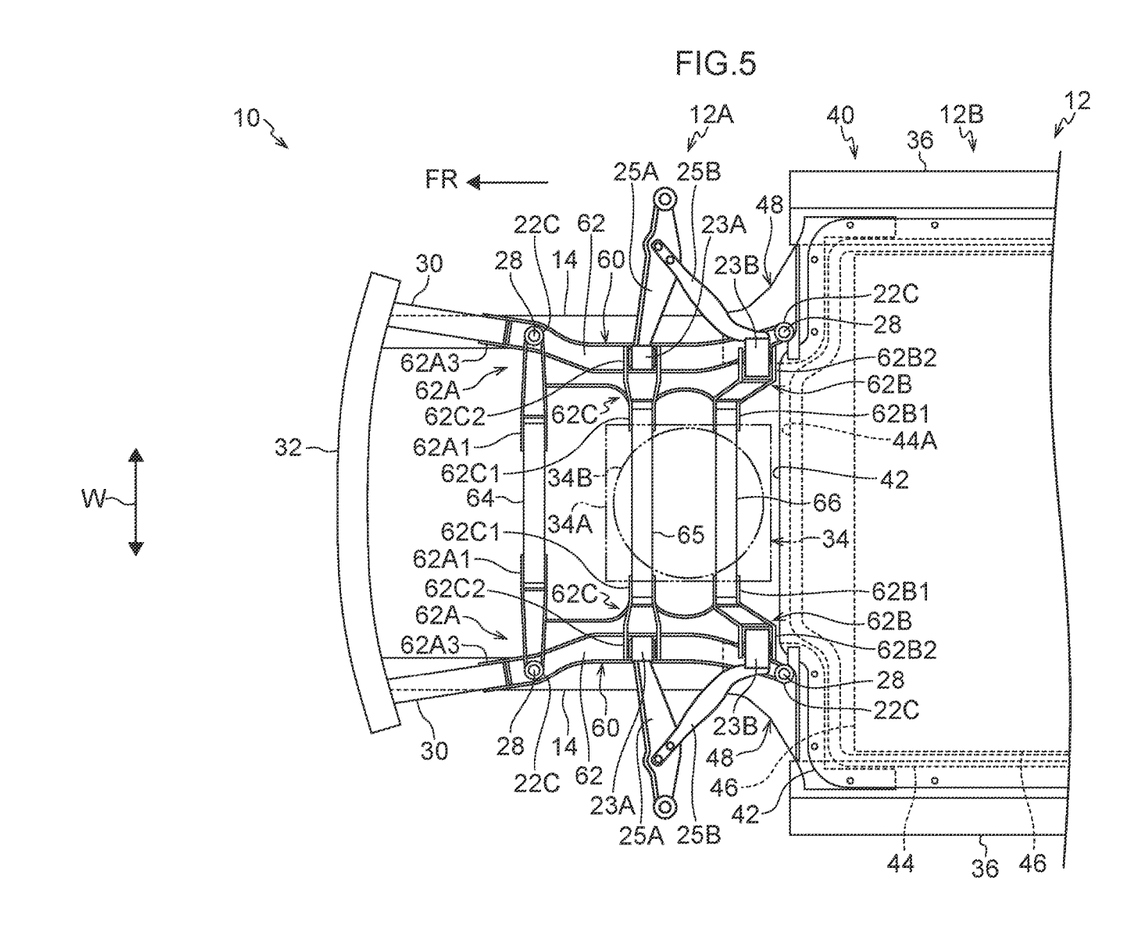
FIG. 5 is a bottom view of a vehicle front portion structure of a second embodiment.

As shown in FIG. 5, the vehicle 12 of the present embodiment has a suspension member 60 instead of the suspension member 20 of the first embodiment. The suspension member 60 has a pair of side rails 62, a front cross member 64, an intermediate cross member 65, and a rear cross member 66.

The pair of side rails 62 are respectively disposed at lower sides of the front side members 14 so as to be apart from the front side members 14 and so as to be substantially parallel to the front side members 14 as seen in a side view. Each of the side rails 62 is made to be a shape that is gently curved such that the vehicle longitudinal direction intermediate portion thereof is convex toward the vehicle transverse direction inner side. The side rail 62 extends toward the rear side longer than the side rail 22 of the first embodiment.

A front end portion 62A that projects-out toward the vehicle transverse direction inner side is formed at a front end of the side rail 62. A rear end portion 62B that projects-out toward the vehicle inner side is formed at a rear end of the side rail 62. An intermediate mounting portion 62C is formed at a longitudinal direction intermediate portion of the side rail 62 (between the front end portion 62A and the rear end portion 62B). The intermediate mounting portion 62C and the rear end portion 62B are disposed further toward an upper side than the front end portion 62A. Further, the bolt fastening portions 22C that are similar to those of the first embodiment are formed at a front end part and a rear end part of the side rail 62, respectively. The respective side rails 62 are supported by the bolts 28 at the vehicle longitudinal direction both end portions, so as to hang-down from the front side members 14.

The front end portion 62A has a front cross mounting portion 62A1 and a lower side mounting portion 62A3 that are formed integrally. The pair of front cross mounting portions 62A1 project-out toward the vehicle transverse direction inner side and face one another in the vehicle transverse direction. The front cross mounting portions 62A1 are connected together by the front cross member 64 that extends in the vehicle transverse direction. The lower side members 30 are connected to the lower side mounting portions 62A3.

The rear end portion 62B has a rear cross mounting portion 62B1 and an arm mounting portion 62B2 that are formed integrally. The pair of rear cross mounting portions 62B1 project-out toward the vehicle transverse direction inner side and face one another in the vehicle transverse direction. The rear cross mounting portions 62B1 are connected together by the rear cross member 66 that extends in the vehicle transverse direction. A bottom surface of the rear cross member 66 is disposed further toward an upper side than a bottom surface of the front cross member 64. The rear lower arms 25B are connected to the arm mounting portions 62B2 via rear bushes 23B that are for damping vibrations.

The intermediate mounting portion 62C has an intermediate cross mounting portion 62C1 and an arm mounting portion 62C2 that are formed integrally. The pair of intermediate cross mounting portions 62C1 project-out toward the vehicle transverse direction inner side and face one another in the vehicle transverse direction. The intermediate cross mounting portions 62C1 are connected together by the intermediate cross member 65 that extends in the vehicle transverse direction. A bottom surface of the intermediate cross member 65 is disposed further toward an upper side than a bottom surface of the front cross member 64. The front lower arms 25A are connected to the arm mounting portions 62C2 via front bushes 23A that are for damping vibrations.

The side rail 62, the front end portion 62A, intermediate mounting portion 62C, the rear end portion 62B and the bolt fastening portions 22C are structured integrally. In the present embodiment as well, the front end portion 62A, the intermediate mounting portion 62C, the rear end portion 62B and the bolt fastening portions 22C are manufactured by aluminum die casting by using aluminum as the main material.

The side rails 62 of the suspension member 60 are connected to the battery front side portion 48 of the battery accommodating portion 40.

Figure 6:
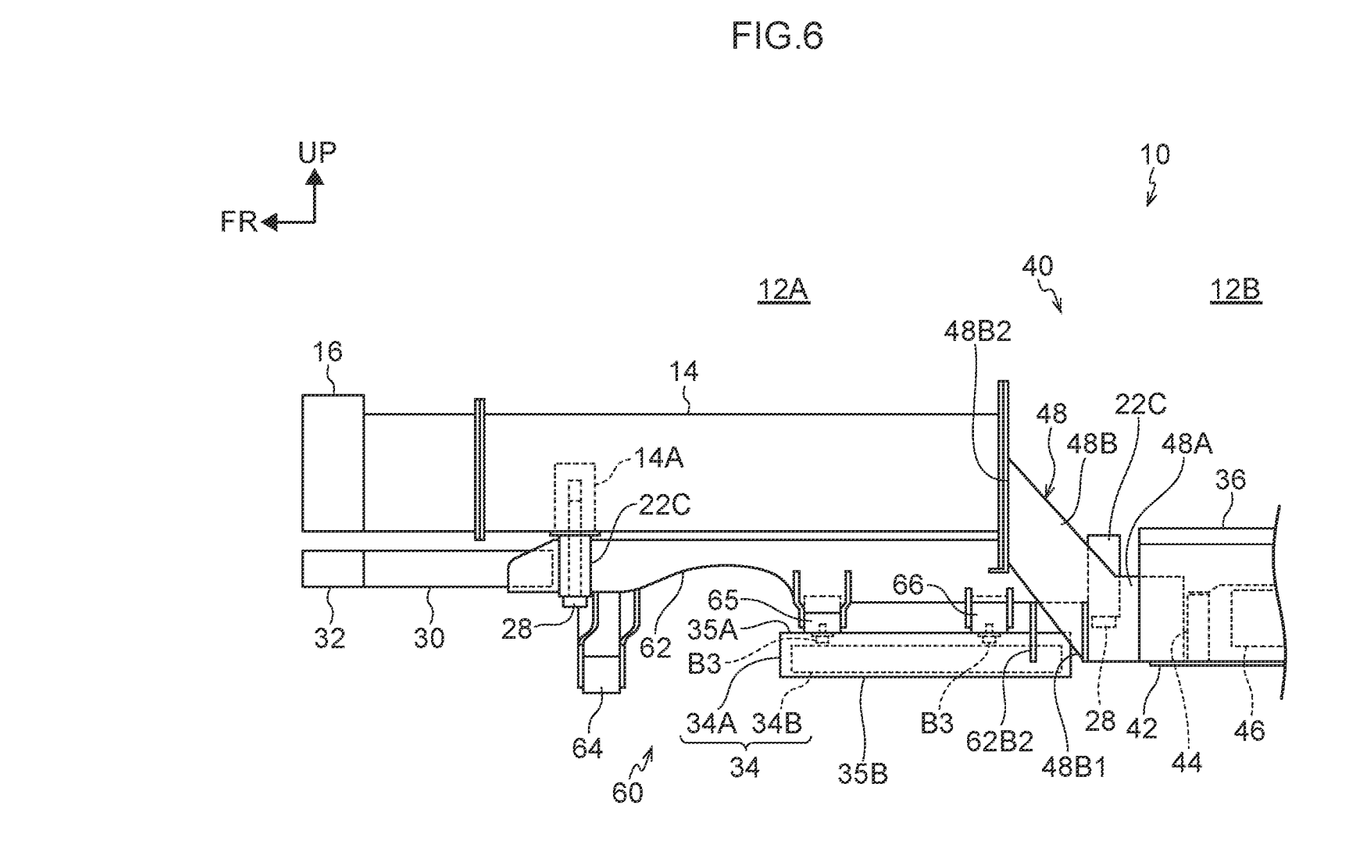
FIG. 6 is a side view showing the vehicle front portion structure of the second embodiment.

As shown in FIG. 6, the non-contact charger 34 is disposed at a lower side of the suspension member 60. The top surface 35A of the non-contact charger 34 is disposed at bottom surface sides of the intermediate cross member 65 and the rear cross member 66, and the non-contact charger 34 is mounted to the rear cross member 66 and the intermediate cross member 65 by the bolts B3.

The front end of the non-contact charger 34 is disposed further toward a front side than the intermediate cross member 65, and is disposed further toward a rear side than the front cross member 64. The rear end of the non-contact charger 34 is disposed further toward a rear side than the rear cross member 66, and is disposed at the front side of the convex frame portion 44A. The bottom surface 35B of the non-contact charger 34 is disposed further toward an upper side than the bottom surface of the front cross member 64.

Operation of the present embodiment is described next.

Charging of the battery 46 is carried out in the same way as in the first embodiment. Further, when the vehicle 12 is traveling, if, on the road, there is an obstacle that may interfere with the bottom surface of the vehicle 12, the non-contact charger 34 can be protected in the same way as in the first embodiment.

Further, in the present embodiment, the non-contact charger 34 is mounted to the intermediate cross member 65 and the rear cross member 66 that structure portions of the suspension member 60. Therefore, there is no need to provide separate members for mounting the non-contact charger 34, and an increase in the number of parts can be suppressed.

Note that, in the present embodiment, the front lower arms 25A are connected to the intermediate mounting portions 62C of the side rails 62, but the front lower arms 25A may be connected to positions corresponding to the front end portions 62A.

Third Embodiment

A third embodiment of the present invention is described next. In the present embodiment, portions that are similar to those of the first and second embodiments are denoted by the same reference numerals, and detailed description thereof is omitted.

Figure 7:
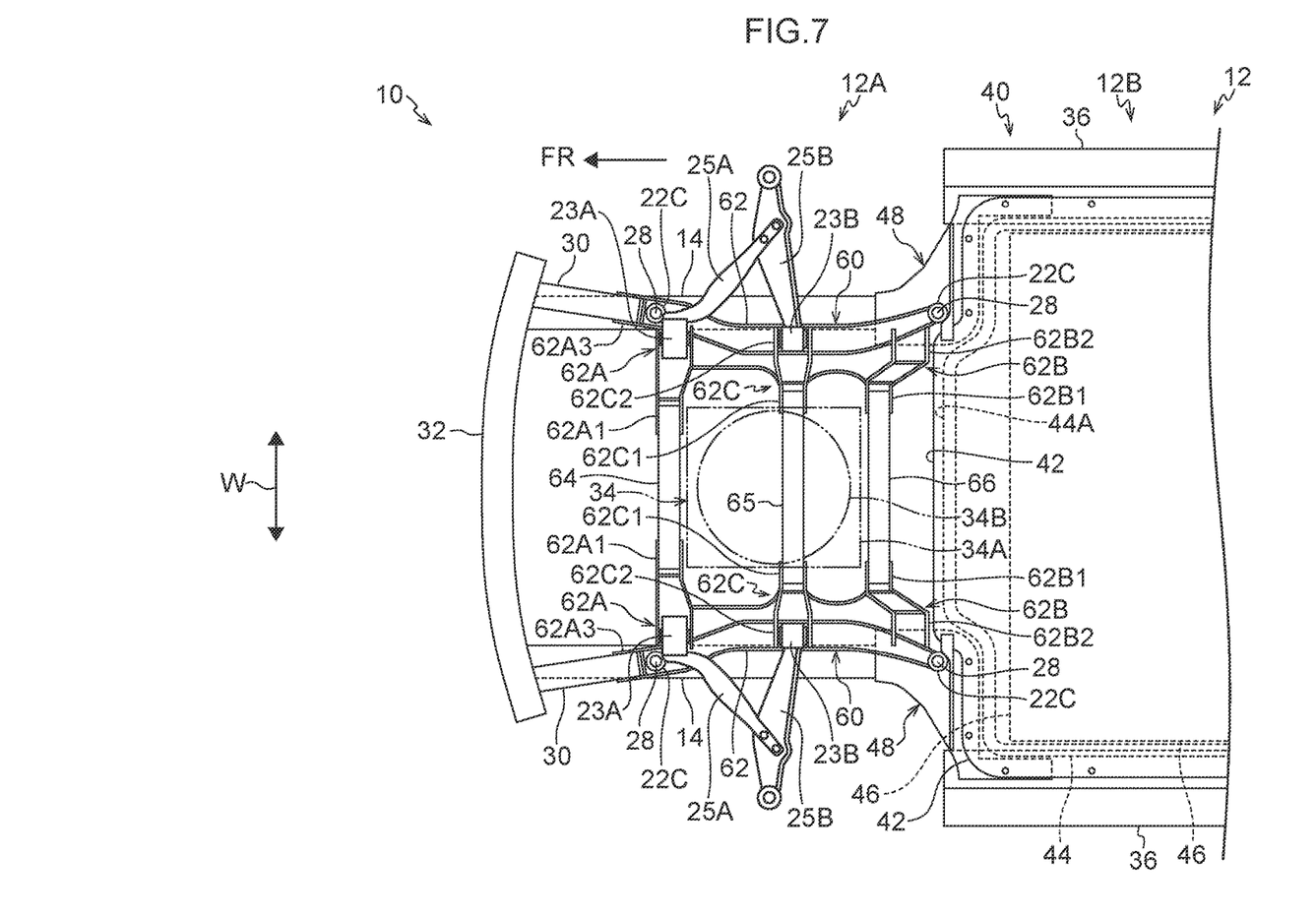
FIG. 7 is a bottom view of a vehicle front portion structure of a third embodiment.
Figure 8:
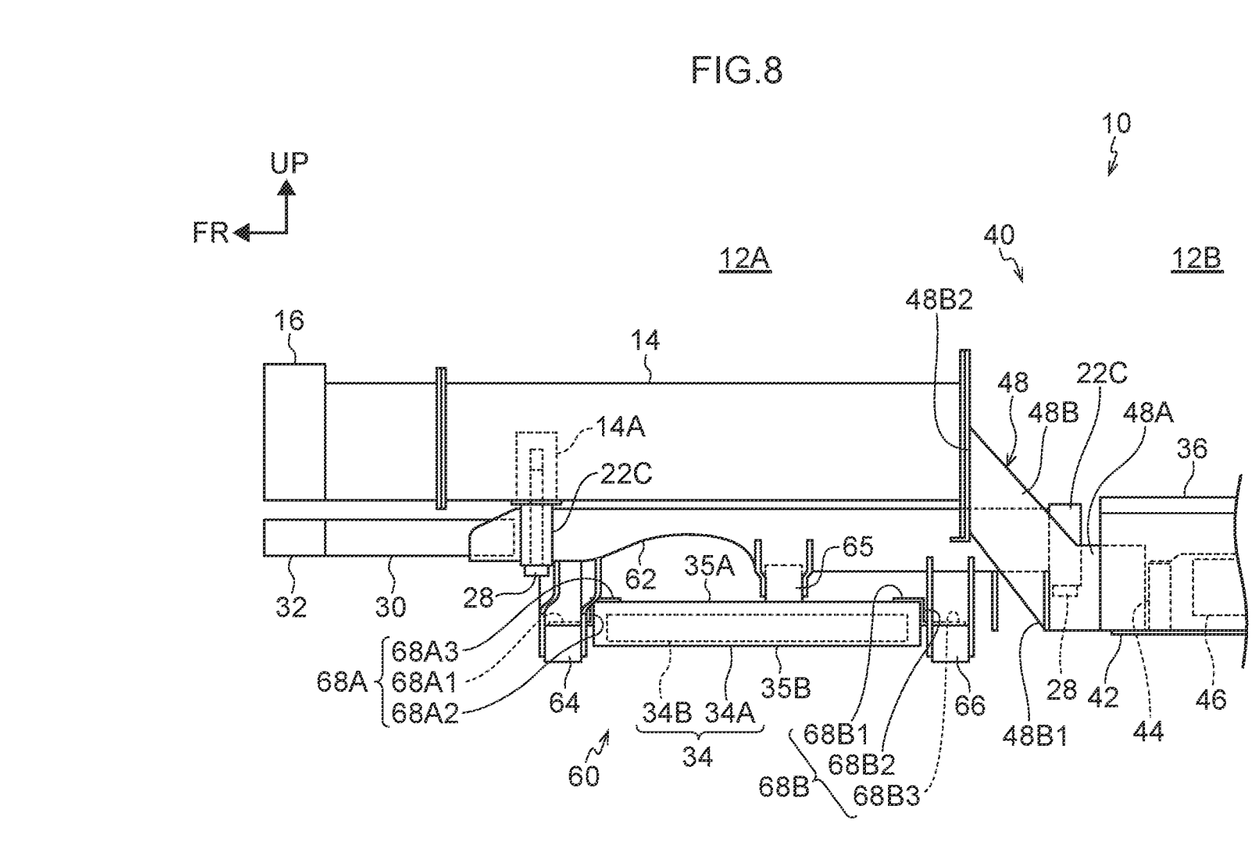
FIG. 8 is a side view showing the vehicle front portion structure of the third embodiment.

In the vehicle 12 of the present embodiment, mainly, the mounted position of the non-contact charger 34, the mounted positions of the front lower arms 25A and the rear lower arms 25B, and the position of the rear cross member 66 differ from those of the second embodiment. The other structures are similar to those of the second embodiment.

The arm mounting portions 22A2 that are similar to those of the first embodiment are formed at the front end part of the suspension member 60. The front lower arms 25A are connected to the arm mounting portions 22A2 via the front bushes 23A for damping vibrations. The rear lower arms 25B are connected to the arm mounting portions 62C2 of the intermediate mounting portions 62C via the rear bushes 23B for damping vibrations. The rear cross member 66 is disposed slightly more toward a lower side than in the second embodiment.

The front end of the non-contact charger 34 is disposed at a rear side of the front cross member 64, and the rear end is disposed at a front side of the rear cross member 66. Namely, the non-contact charger 34 is disposed between the front cross member 64 and the rear cross member 66 in the vehicle longitudinal direction. The non-contact charger 34 is mounted to the front cross member 64 via front mounting plates 68A, and is mounted to the rear cross member 66 via rear mounting plates 68B.

The front mounting plate 68A is shaped as a substantially Z-shaped plate as seen from the plate thickness direction thereof. The front mounting plate 68A has a front end surface 68A1, an erect surface 68A2 that is bent upward from a rear end of the front end surface 68A1, and a rear end surface 68A3 that is bent toward the rear from an upper end of the erect surface 68A2. A bottom surface of the front end surface 68A1 is joined to a top surface of the front cross member 64, and a bottom surface of the rear end surface 68A3 is joined to a top surface of the front end of the housing 34A of the non-contact charger 34. The bottom surface of the housing 34A of the non-contact charger 34 is disposed further toward the upper side than the bottom surface of the front cross member 64.

The rear mounting plate 68B is shaped as a substantially Z-shaped plate as seen from the plate thickness direction thereof. A rear mounting plate 68B has a front end surface 68B1, an erect surface 68B2 that is bent downward from a rear end of the front end surface 68B1, and a rear end surface 68B3 that is bent toward the rear from a lower end of the erect surface 68B2. A bottom surface of the front end surface 68B1 is joined to the top surface of the rear end of the housing 34A of the non-contact charger 34, and a bottom surface of the rear end surface 68B3 is joined to a top surface of the rear cross member 66. The bottom surface 35B of the housing 34A of the non-contact charger 34 is disposed further toward the upper side than the bottom surface of the rear cross member 66.

Operation of the present embodiment is described next.

Charging of the battery 46 is carried out in the same way as in the first embodiment. Further, when the vehicle 12 is traveling, if, on the road, there is an obstacle that may interfere with the bottom surface of the vehicle 12, the non-contact charger 34 can be protected in the same way as in the first embodiment. Moreover, in the present embodiment, in the case of a front collision, the impact load can be transmitted from the front cross member 64 via the non-contact charger 34 to the rear cross member 66.

Further, in the present embodiment, the non-contact charger 34 is mounted to the front cross member 64 and the rear cross member 66 that structure portions of the suspension member 60. Therefore, there is no need to provide separate members for mounting the non-contact charger 34, and an increase in the number of parts can be suppressed.

Further, in the present embodiment, when the vehicle 12 is traveling in reverse, even if, on the road, there is an obstacle that may interfere with the bottom surface of the vehicle 12, the rear cross member 66 that projects-out further toward the lower side than the non-contact charger 34 contacts this obstacle. Accordingly, also when the vehicle 12 is traveling in reverse, either contact between the non-contact charger 34 and the obstacle can be avoided, or, even if the obstacle does contact the non-contact charger 34, the load input to the non-contact charger 34 is reduced, and the non-contact charger 34 can be protected.

Note that, in the present embodiment, the rear lower arms 25B are connected to the intermediate mounting portions 62C of the side rails 62, but the rear lower arms 25B may be connected to positions corresponding to the rear end portions 62B.

Further, in the present embodiment, the non-contact charger 34 is mounted to the front cross member 64 and the rear cross member 66, but may be mounted to other members such as the front side members 14 or other members for example.

Further, in the present embodiment, the bottom surface of the front cross member that structures the suspension member is disposed further toward the lower side than the bottom surface 35B of the housing 34A of the non-contact charger 34. However, another member that extends in the vehicle transverse direction may be disposed further toward the lower side than the bottom surface 35B of the housing 34A of the non-contact charger 34.

What is claimed is:

1. A vehicle front portion structure comprising:
    a non-contact charger disposed at a lower side of a vehicle front portion, the non-contact charger being configured to receive electric power transmitted from a non-contact power transmitting system and charge a battery that is installed in a vehicle;
    a front cross member disposed at the vehicle front portion further toward a vehicle front side than the non-contact charger, the front cross member extending in a vehicle transverse direction, a bottom surface of the cross member being disposed further toward a vehicle lower side than a bottom surface of the non-contact charger; and
    a suspension member including a pair of side rails provided at the vehicle front portion, the pair of side rails being separated from each other in the vehicle transverse direction, each side rail of the pair of side rails extending in a vehicle longitudinal direction and including an arm extending outward in the vehicle transverse direction, the front cross member spanning between the pair of side rails.

2. The vehicle front portion structure of claim 1, wherein the non-contact charger is mounted to the front cross member.

3. The vehicle front portion structure of claim 1, further comprising:
    a rear cross member spanning between the pair of side rails, the rear cross member structuring a portion of the suspension member and being disposed further toward a vehicle rear side than the front cross member, the non-contact charger being mounted to the rear cross member.

4. The vehicle front portion structure of claim 3, further comprising a bottom surface of the rear cross member disposed further toward the vehicle lower side than the bottom surface of the non-contact charger,
    wherein the non-contact charger is disposed between the front cross member and the rear cross member.

5. The vehicle front portion structure of claim 3, further comprising:
    an intermediate cross member spanning between the pair of side rails, the intermediate cross member structuring a portion of the suspension member and being disposed between the front cross member and the rear cross member, wherein the non-contact charger is mounted to any two cross members of the front cross member, the intermediate cross member, or the rear cross member.

\* \* \* \* \*